United States Patent Office 3,505,457
Patented Apr. 7, 1970

3,505,457
METHODS OF COMBATTING FUNGAL ORGANISMS WITH 2,5-DISUBSTITUTED α-IODOACETANILIDES
John S. Adams, Jr., Centerville, Ohio, and David L. Gerwitz, Kirkwood, Mo., assignors to Monsanto Research Corporation, St. Louis, Mo., a corporation of Delaware
No Drawing. Filed Aug. 1, 1966, Ser. No. 569,070
Int. Cl. A01n 9/20
U.S. Cl. 424—324        9 Claims

ABSTRACT OF THE DISCLOSURE

Compounds of the formula

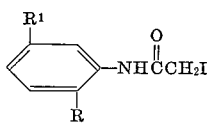

wherein R and R¹ are selected from the group consisting of chlorine, $NO_2$, hydroxy, alkyl of not more than 4 carbon atoms and alkoxy of not more than 4 carbon atoms.

These compounds are utilized as fungicides.

---

This invention relates to certain novel 2,5-disubstituted α-iodoacetanilides which are useful as microbiocides, particularly fungicides. This invention also relates to fungicidal compositions and to methods for the control of fungal organisms.

Many compounds known to be effective for the control of fungal organisms have no practical value because of their phytotoxicity or mammalian toxicity. α-Iodoacetanilide possesses some fungicidal activity, but it is also both a pre- and a post-emergent phytotoxicant. This compound cannot safely be applied to foliage for the control of phytopathogenic fungi in an amount sufficient to exert fungicidal activity since it is phytotoxic to the host plant. When applied to the soil for the control of soil-borne pathogenic fungi, the growth of viable seeds and emerging seedlings is effectively inhibited. Moreover, the mammalian toxicity of α-iodoacetanilide is not favorable to its use as a fungicide. Likewise, the use of many aryl-substituted α-iodoacetanilides which exhibit some fungicidal activity is severely limited in view of their phytotoxicity or mammalian toxicity.

In accordance with this invention it has been discovered that fungal organisms can be controlled by exposing the organisms to an effective amount of a compound of the formula

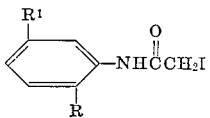

wherein R and R¹ are each selected from the group consisting of Cl, $NO_2$, hydroxy, alkyl of not more than 4 carbon atoms and alkoxy of not more than 4 carbon atoms.

The 2,5-disubstituted α-iodoacetanilides of this invention are effective in the control of both soil-borne pathogenic fungi and phytopathogenic fungi. They are advantageously employed as foliage fungicides since they are not injurious to the host plant. Such persistance or residual effect in the host ensures prolonged protection from post treatment attack by phytopathogenic fungi. Another advantage of the present compounds is that they are significantly less toxic to mammals than α-iodoacetanilide. The present compounds exhibit microbiocidal action on a wide variety of soil-borne pathogenic fungi such as *Phythium ultimum* and *Rhizoctonia solani* and phytopathogenic fungi such as *Phytophthora infestans, Alternaria solani, Venturi inaequalis, Plasmopara viticola, Piricularia oryzae, Alternaria kikuchiana, Ophiobolus myabeanus, Phythium aphanidermatum,* Botrytis sp., *Monilinia fructicola* and *Pellicularia filamentosa.*

The 2,5-disubstituted α-iodoacetanilides of this invention are prepared by a process which comprises reacting a 2,5-disubstituted aniline with chloroacetyl chloride and then reacting the resulting 2,5-disubstituted α-chloroacetanilide with an alkali metal iodide in accordance with the following representative synthesis:

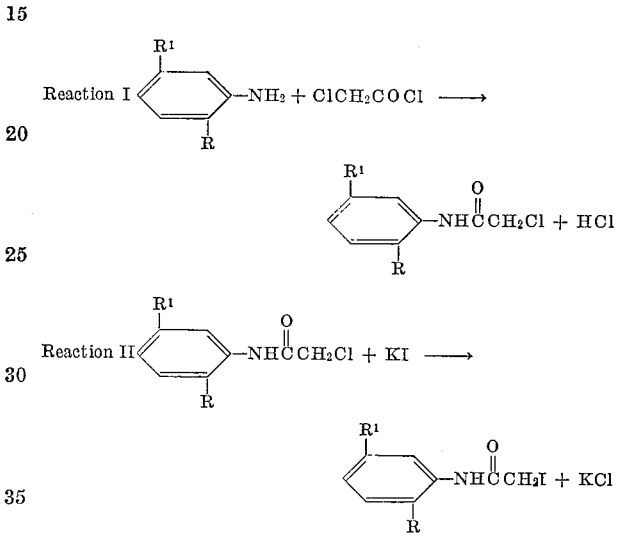

wherein R and R¹ are as defined above.

Reaction I can be carried out in various ways. Normally it is desired for maximum yield that the substituted aniline be present in at least an equimolar amount to the chloroacetyl halide and preferably in excess of equimolar amount. The reaction is suitably carried out at temperatures below room temperature, i.e. about 0° C. to 25° C. However, higher temperatures can be used, the temperature not being critical. For example, temperatures above about 40° C. are generally employed when no acid acceptor is used.

Reaction I is preferably carried out in the presence of an acid acceptor and an inert organic medium. The acid acceptor is generally present in at least equimolar amounts based on the amount of hydrogen halide formed in the reaction. Suitable acid acceptors, e.g. alkaline-acting or basic materials capable of binding the acid evolved in the reaction, are the tertiary amines such as trimethylamine and triethylamine, pyridine, quaternary ammonium hydroxides, N-ethylmorpholine and the like; inorganic bases such as sodium hydroxide and potassium hydroxide, sodium carbonate and the like. An excess of aniline reactant also serves as an acid acceptor.

Inert organic media which can be used in Reaction I include by way of example hydrocarbons such as benzene, toluene, xylene, cyclohexane, methylcyclohexane, n-heptane, n-hexane and the like, ethers such as ethyl ether, isopropyl ether, n-butyl ether, 1,4-dioxane, isobutyl ether, diethyl ether and the like, aliphatic and cycloaliphatic ketones such as methyl isopropyl ketone, methyl isobutyl ketone, methyl isoamyl ketone, diisopropyl ketone, cyclohexanone and the like, and organic halides such as carbon tetrachloride, n-butyl chloride, ethylene dichloride, dichloroethane, tetrachloroethylene and the like.

The separation of the α-chloroacetanilide from the reaction mixture is readily accomplished. For example, the salt, such as a tertiary amine hydrochloride salt formed during the reaction because of the presence of a tertiary amine compound therein as an acid acceptor, is separated from the reaction mixture by filtration and the solvent is removed from the resulting filtrate by stripping or distillation, preferably low temperature vacuum distillation. The product, if desired, can be purified by any of the conventional means well known in the art, e.g. fractional distillation under reduced pressure, selective extraction, fractional distillation using a carrier gas, recrystallization, film distillation or any suitable combination of these.

Reaction II is carried out by heating the α-chloroacetanilide with at least an equimolar amount of alkali metal iodide in the presence of an inert organic medium at a temperature from about 40° C. to about 175° C. Inert organic media listed above for Reaction I are suitably employed in Reaction II. Likewise, the α-iodoacetanilides can be recovered from the reaction mixture using the methods employed above in Reaction I.

For the sake of brevity, the term "active ingredient" is used hereinafter in this specification to describe the 2,5-disubstituted α-iodoacetanilides of this invention.

In carrying out the fungicidal methods of this invention, one or more of the active ingredients is applied to the fungal organism or the material to be treated for the control of fungi in an amount sufficient to exert fungicidal activity. The fungicidal compounds of this invention are particularly effective when applied directly to the soil or to plants such as vegetables, ornamental shrubs and fruit-bearing trees. In application to soil and plants, fungal control is obtained in most instances by the application of active ingredient in an amount from about 0.01 to about 30 pounds per acre. The preferred amount is determined by and dependent upon the particular fungicidal compound selected, the method of application, the state and condition of growth of the plant and the climatic conditions.

The active ingredients of this invention can also be employed in combination with a material referred to in the art as a fungicidal adjuvant in liquid or solid form. The fungicidal compositions of this invention are prepared by admixing the active ingredient with an adjuvant including diluents, extenders, carriers and conditioning agents to provide compositions in the form of finely-divided particulate solids, granules, pellets, aerosols, solutions and dispersions or emulsions. Thus the active ingredient can be used with an adjuvant such as a finely-divided particulate solid, a liquid of organic origin, water, a wetting agent, dispersing agent, an emulsifying agent or any suitable combination of these. The fungicidal compositions of this invention can contain from about 0.01% to about 99.99% by weight of the active ingredient.

Typical finely-divided solid carriers and extenders which can be used in the fungicidal compositions of this invention include for example, the talcs, clays, pumice, silica, lime, calcium carbonate, diatomaceous earth, quartz, fuller's earth, salt, sulfur, powdered cork, powdered wood, charcoal, walnut flour, chalk, tobacco dust, volcanic ash, cottonseed hulls, wheat flour, soybean flour, tripoli, and the like. Typical liquid diluents include, for example, water, kerosene, Stoddard solvent, hexane, benzene, toluene, acetone, ethylene dichloride, xylene, alcohols, diesel oil, glycols and the like. Typical diluents for aerosols include, for example, haloalkyls such as dichlorodifluoromethane, trichlorofluoromethane, and the like.

The fungicidal compositions of this invention, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

The term "fungicidal composition" as used herein and in the appended claims is intended to mean not only compositions in a suitable form for application but also concentrated compositions which require dilution or extension with a suitable quantity of liquid or solid adjuvant prior to application.

The following examples will illustrate the invention. Parts and percents are by weight unless otherwise indicated.

EXAMPLE 1

A suitable reaction vessel is charged with about 81 parts of 2,5-dichloroaniline, 400 parts of dichloroethane and about 130 parts of a 20% aqueous solution of sodium hydroxide. The contents of the reaction vessel are cooled to about 0° C. and about 87 parts of chloroacetyl chloride are added with stirring over a 1½ hour period. The resultant 2,2′,5-trichloroacetanilide is separated from the reaction mixture by decantation and dried over magnesium sulfate. About 50 parts of the 2,2′,5-trichloroacetanilide are admixed with about 500 parts of acetone and refluxed with about 40 parts of potassium iodide for about 3 hours. The mixture is filtered and the solvent removed by evaporation to give a solid residue. The solid residue is recrystallized from ethyl alcohol to give about 47 parts of 2,5-dichloro-α-iodoacetanilide having a melting point of about 177–178° C.

Calculated for $C_8H_6Cl_2INO$ (percent): C, 29.2; H, 1.8; N, 4.3. Found (percent): C, 29.3; H, 1.9; N, 4.3.

EXAMPLE 2

A suitable reaction vessel is charged with about 18.2 parts of 2,5-dimethylaniline, 16.9 parts of chloroacetyl chloride and 200 parts of benzene. The reaction mixture is heated at reflux for about 5 hours and then cooled. The resultant 2,5 - dimethyl α - chloroacetanilide is separated from the reaction mixture by filtration and recrystallized from ethyl alcohol. About 9.9 parts of the 2,5-dimethyl α-chloroacetanilide and 30 parts of sodium iodide are heated at reflux in acetone for about 17 hours. The acetone is removed by evaporation under vacuum. The residue is admixed with water and then extracted with dichloromethane. The extract is cooled to give about 12.6 parts of 2,5-dimethyl α-iodoacetanilide having a melting point of 170° C.–172° C.

EXAMPLE 3

A suitable reaction vessel is charged with about 15.3 parts of 2,5-dimethoxyaniline, 11.3 parts of chloroacetyl chloride and 200 parts of benzene. The reaction mixture is heated at reflux for about 3 hours and then the solvent is removed by evaporation under vacuum. The resultant 2,5-dimethoxy α-chloroacetanilide is recrystallized from ethyl alcohol. About 11.5 parts of the 2,5-dimethoxy α-chloroacetanilide and 30 parts of sodium iodide are heated at reflux in acetone for about 21 hours. The acetone as removed by evaporation under vacuum. The residue is admixed with water and then extracted with dichloromethane. The extract is dried over magnesium sulfate and admixed with hexane. The solid which forms is recrystallized from ethyl alcohol to give about 14 parts of 2,5-dimethoxy α-iodoacetanilide having a melting point of 99° C.–100° C.

EXAMPLE 4

A suitable reaction vessel is charged with about 22.8 parts of 2-methyl-5-nitroaniline, 16.9 parts of chloroacetyl chloride and 200 parts of benzene. The reaction mixture is heated at reflux for about 6 hours and then cooled. The resultant 2-methyl-5-nitro α-chloroacetanilide is separated from the reaction mixture by filtration and recrystallized from ethyl alcohol. About 18.3 parts of the 2-methyl-5-nitro α-chloroacetanilide and 12 parts of sodium iodide are heated at reflux in acetone for about 17 hours. The acetone is removed by evaporation under vacuum. The residue is admixed with water and then extracted with dichloroethane. The extract is cooled to give about 21.8 parts of 2-methyl-5-nitro α-iodoacetanilide having a melting point of 192° C.–194° C.

EXAMPLE 5

A suitable reaction vessel is charged with about 21.5 parts of 2-hydroxy-5-chloroaniline, 16.9 parts of chloroacetyl chloride and 200 parts of benzene. The reaction mixture is heated at reflux for about 6 hours and then cooled. The resultant 2-hydroxy-5-chloro α-chloroacetanilide is separated from the reaction mixture by filtration and recrystallized from ethyl alcohol. About 16.5 parts of the 2-hydroxy-5-chloro α-chloroacetanilide and 11.2 parts of sodium iodide are heated at reflux in acetone for about 18 hours. The acetone is removed by evaporation under vacuum. The residue is admixed with water and filtered. The solid is recrystallized from ethyl alcohol to give about 16.8 parts of 2-hydroxy-5-chloro α-iodoacetanilide having a melting point of 190° C.–192° C.

EXAMPLE 6

A suitable reaction vessel is charged with about 30.8 parts of 2-hydroxy-5-nitroaniline, 22.6 parts of chloroacetyl chloride and 200 parts of acetone. The reaction mixture is heated at reflux for about 6 hours and then cooled. The resultant 2-hydroxy-5-nitro α-chloroacetanilide is separated from the reaction mixture by filtration, washed several times with water and recrystallized from ethyl alcohol. About 18.4 parts of the 2-hydroxy-5-nitro α-chloroacetanilide and 12 parts of sodium iodide are heated at reflux in acetone for about 18 hours. The acetone is removed by evaporation under vacuum. The residue is admixed with water and filtered. The solid is recrystallized from ethyl alcohol to give about 17.8 parts of 2-hydroxy-5-nitro α-iodoacetanilide having a melting point of 205° C. with decomposition.

EXAMPLE 7

A suitable reaction vessel is charged with about 18.9 parts of 2-methoxy-5-chloroaniline, 13.6 parts of chloroacetyl chloride and 200 parts of benzene. The reaction mixture is heated at reflux for about 4 hours and then cooled. The resultant 2-methoxy-5-chloro α-chloroacetanilide is separated from the reaction mixture by filtration and recrystallized from ethyl alcohol. About 14 parts of the 2-methoxy-5-chloro α-chloroacetanilide and 9 parts of sodium iodide are heated at reflux in acetone for about 18 hours. The acetone is removed by evaporation under vacuum. The residue is admixed with water and then extracted with dichloromethane. The extract is washed with sodium sulfite, dried over magnesium sulfate and concentrated to give colorless crystals. The crystals are recrystallized from dichloromethane/hexane to give 18.7 parts of 2-methoxy-5-chloro α-iodoacetanilide having a melting point of 142° C.–144° C.

Following substantially the same procedure as in the foregoing examples and using the appropriate aniline reactant, the following compounds of this invention are prepared.

Example:
- 8 _____ 2,5-dipropyl-α-iodoacetanilide
- 9 _____ 2,5-diethyl-α-iodoacetanilide
- 10 _____ 2,5-di-n-butyl-α-iodoacetanilide
- 11 _____ 2,5-di-tert-butyl-α-iodoacetanilide
- 12 _____ 2,5-dihydroxy-α-iodoacetanilide
- 13 _____ 2,5-dinitro-α-iodoacetanilide
- 14 _____ 2,5-dipropoxy-α-iodoacetanilide
- 15 _____ 2,5-dibutoxy-α-iodoacetanilide
- 16 _____ 2-chloro-5-methyl-α-iodoacetanilide
- 17 _____ 2-chloro-5-methoxy-α-iodoacetanilide
- 18 _____ 2-methoxy-5-nitro-α-iodoacetanilide
- 19 _____ 2-methyl-5-chloro-α-iodoacetanilide
- 20 _____ 2-methoxy-5-methyl-α-iodoacetanilide
- 21 _____ 2-n-butyl-5-chloro-α-iodoacetanilide The fungicidal activity of α-iodoacetanilide and representative 2,5-disubstituted α-iodoacetanilides of this invention against *Venturia inaequalis* (apple scab) is deconstrated as follows: Young apple seedlings which have been selected for uniformity are each sprayed with about 10 ml. of a fungicidal composition comprising water, acetone, a surfactant and an anilide. The amount of anilide present in each composition is shown in Table I and Table II below in p.p.m. Twenty-four hours later the same plants are sprayed with a conidial suspension of *Venturia inaequalis* containing about $2.5 \times 10^6$ spores per ml. of water. In addition, control plants which had not been sprayed with a fungicidal composition are sprayed with the *V. inaequalis* spore suspension. All plants are then placed in an incubation chamber at about 20° C., 100% relative humidity for three days. The plants are removed from the chamber and placed in a greenhouse where the fungicidal and phytotoxic effects are observed and recorded 14 days later. Results and further details are given in Table I and Table II below.

TABLE I.—FUNGICIDAL ACTIVITY

| Anilide | Percent control, of *V. inaequalis* Concentration, p.p.m. | | | | |
|---|---|---|---|---|---|
|  | 100 | 60 | 30 | 10 | 3 |
| α-Iodoacetanilide | 94 | 60 | 22 | 25 | 0 |
| 2,5-dichloro-α-iodoacetanilide | 98 | 95 | 88 | 67 | 46 |
| 2-methoxy-5-chloro-α-iodoacetanilide | 94 |  | 73 | 36 | 16 |
| 2-chloro-5-methyl-α-iodoacetanilide | 85 |  | 68 | 27 | 4 |
| 2,5-dimethyl-α-iodoacetanilide | 92 | 90 | 77 | 39 | 16 |

The phytotoxicity of some of the above anilides to apple seedlings is given in Table II below. For the sake of brevity the phytotoxicity is expressed in Table II by a numerical scale from 1 to 5 wherein 1=No phytotoxicity
2=Slight necrosis under leafs
3=Necrosis through leafs
4=Severe necrosis
5=Plants dead

TABLE II.—PHYTOXICITY

| Anilide | Concentration, p.p.m. | | |
|---|---|---|---|
|  | 10,000 | 3,000 | 1,000 |
| α-Iodoacetanilide | 5 | 4 | 3 |
| 2,5-dichloro-α-iodoacetanilide | 1 | 1 | 1 |
| 2,5-dimethyl-α-iodoacetanilide | 2 | 1 | 1 |

The fungicidal activity of α-iodoacetanilide and representative 2,5-disubstituted α-iodoacetanilides of this invention against *Phytophthora infestans* (late blight) is demonstrated as follows: Seedling tomato plants (Bonnie Best) are each sprayed with about 10 ml. of a fungicidal composition comprising water, acetone, a wetting agent and an anilide. The amount of anilide present in each composition is given in Table III below in p.p.m. Twenty-four hours later the same plants are sprayed with a suspension of zoospores of *Phytophthora infestans* (1500 sporangia/ml.). The plants are placed in an incubation chamber at about 20° C., 100% relative humidity for three days. The plants are removed from the chamber and placed in a greenhouse where the fungicidal activity is observed and recorded 14 days later.

TABLE III.—FUNGICIDAL ACTIVITY

| Anilide | Percent Control of *Phytophthora infestans* Concentration, p.p.m. | | | |
|---|---|---|---|---|
|  | 300 | 100 | 30 | 10 |
| α-Iodoacetanilide | 95 | 79 | 0 | 0 |
| 2,5-dichloro-α-iodoacetanilide | 100 | 99 | 97 | 34 |
| 2-methoxy-5-chloro-α-iodoacetanilide | 94 | 95 | 74 | 38 |
| 2,5-dimethyl-α-iodoacetanilide | 94 | 94 | 89 | 34 |

The mammalian toxicity of α-iodacetanilide and representative compounds of this invention as determined in tests on rats and rabbits is presented in Table IV below:

TABLE IV.—MAMMALIAN TOXICITY

|  | (a) | (b) | (c) |
| --- | --- | --- | --- |
| Oral LD$_{50}$ | 421 mg./kg. | 12,500 mg./kg. | 7,300 mg./kg. |
| Skin MLD | 510 mg./kg. | 1,580–2,510 mg./kg. | 5,010 mg./kg. |
| Irritation, eyes | Corrosive | Moderate | None. |
| Irritation, skin | do | do | Corrosive. |

(a) α-Iodoacetanilide.
(b) 2,5-dichloro-α-iodoacetanilide.
(c) 2,5-dimethyl-α-iodoacetanilide.

The fungicidal activity of the present compounds against soil-borne fungi is demonstrated as follows.

An intimate mixture of 2 volumes of yellow corn meal and 3 volumes of white sand is infested with a particular pathogen (below itemized) and incubated for two weeks at 20° C. Then one volume of this infested mixture is blended uniformly with 3 volumes of a good grade of top soil which had been sterilized. To accomplish complete blending the composite of soil and infested mixture is passed through a No. 8 screen (U.S.S.) three times. A number of small cups are then tightly packed with 30 gram portions of the composite and the surface thereof leveled.

A sufficient amount of active ingredient is dissolved in acetone to make a 1% by weight solution which is then diluted with water to provide a formulation having a concentration of 0.1% by weight. To provide the desired concentration in the aforedescribed soil composite the following further dilutions with water are made:

Conc. desired in soil in p.p.m. _____ 30
Ml. of 0.1% formulation _____ 1
Ml. of water added to formulation _____ 3

The 4 ml. portions are drenched over the surface of the soil in each cup, care being taken to insure even distribution. The cups are then placed in a 100% humidity chamber at 70° F. for 48 hours. Upon removal from the chamber the amount of mycelial growth on the surface of the soil is noted and rated as follows:

1 = no growth
2 = partial growth
3 = growth equivalent to that on untreated soil.

The results obtained with representative active ingredients at a soil concentration of 30 p.p.m. are set forth below for each of the two indicated fungal organisms:

| Compound | Fungal Organism | |
| --- | --- | --- |
|  | Pythium ultimum | Rhizoctonia solani |
| 2,5-dimethyl-α-iodoacetanilide | 1 | 2 |
| 2,5-dimethoxy-α-iodoacetanilide | 1 | 1 |
| 2,5-diethyl-α-iodoacetanilide | 2 | 1 |
| 2-hydroxy-5-chloro iodoacetanilide | 1 | 1 |
| 2-chloro-5-methyl-α-iodoacetanilide | 1 | 1 |
| 2-methoxy-5-chloro-α-iodoacetanilide | 2 | 2 |

The effectiveness of additional compounds of this invention as fungicides is illustrated below.

*Slide germination test.*—The concentration of active ingredient required to substantially inhibit germination of spores from 7- to 10-day old cultures of *Venturia inaequalis* is determined by the slide germination test. A concentrated formulation of 1.0 gram of the active ingredient (below itemized), acetone and 0.1 gram of sorbitan monolaurate polyoxyethylene derivative (a commerical water-soluble non-ionic emulsifying agent) is prepared. This concentrated formulation is diluted with sufficient water to provide an aqueous emulsion containing 10 p.p.m. of the active ingredient. To a test tube is then added four volumes of the aqueous emulsion, one volume of spore stimulant and one volume of spore suspension, the spore stimulant being added to insure a high and relatively stable percentage of germination of the control. Drops of the test specimen mixture and an untreated control are pipetted onto glass slides. The glass slides are then placed in moist chambers for 20 hours incubation at 22° C. Germination counts are made by counting 100 potentially viable spores, i.e. those spores which would germinate under the normal conditions of the control. Results and further details are given below.

| Compound: | Germination |
| --- | --- |
| Control | Complete |
| 2-methyl-5-nitro α-iodoacetanilide | None |
| 2-methoxy-5-nitro α-iodoacetanilide | None |
| 2,5-diethoxy α-iodoacetanilide | None |
| 2,5-diethyl α-iodoacetanilide | None |
| 2,5-dimethoxy α-iodoacetanilide | None |

In a similar evaluation against the late blight fungus *Phytophthora infestans* at a concentration of 10 p.p.m., the five compounds listed immediately hereinabove and 2-hydroxy-5-chloro-α-iodoacetanilide each completely prevented germination of spores of said fungus.

As mentioned hereinbefore the fungicidal compositions of this invention comprise an active ingredient and one or more fungicidal adjuvants which can be sold or liquid extenders, carriers, diluents, spreading agents, conditioning agents and the like. Preferred fungicidal compositions containing the active ingredients of this invention have been developed so that the active ingredients can be used to the greatest advantage in the control of fungal organisms. The preferred compositions comprise certain wettable powders, aqueous suspensions, dust formulation, granules, emulsifiable oils and solutions in solvents. In general these preferred compositions can all contain one or more surface-active agents.

Surface-active agents which can be used in the fungicidal compositions of this invention are set out, for example, in Searle U.S. Patent 2,426,417, Todd U.S. Patent 2,655,447, Jones U.S. Patent 2,412,510 and Lenher U.S. Patent 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general less than 15 parts by weight of the surface active agent is present per 100 parts by weight of fungicidal composition.

Wettable powders are water-dispersible compositions containing one or more active ingredients, an inert solid extender and one or more wetting and dispersing agents. The inert solid extenders are usually of mineral origin such as the natural clays diatomaceous earth and synthetic minerals derived from silica and silicates. Examples of such extenders include kaolinites attapulgite clay and synthetic magnesium silicate.

Preferred wetting agents are biodegradable and non-biodegradable sodium alkylbenzene and sodium alkylnaphthalene sulfonates, sulfated fatty alcohols, amines or acid amines, long chain acid esters of sodium isethionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphtalenesulfonate and sodium N-methyl-N-(long chain acid) taurates.

The wettable powders compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform. Water-soluble active ingredients can be used in the form of aqueous solutions to advantage in many instances.

Dusts are dense finely-divided particulate compositions which are characterized by their free-flowing and rapid settling properties so that they are not readily wind-borne to areas where they are of no value. Dusts contain primarily an active ingredient and a dense, free-flowing, finely-divided particulate extender. However, their performance is sometimes aided by the inclusion of a wetting agent such as those listed hereinbefore under wettable powder compositions and convenience in manufacture frequently demands the inclusion of an inert absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for fungicidal dusts include micaceous talcs, pyrophyllite, dense kaolin clays, ground calcium phosphate rock and tobacco dust. The dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

The wettable powders described above may also be used in the preparation of dusts. While such wettable powders could be used directly in dust form it is more advantageous to dilute them by blending with the dense dust diluent. In this manner dispersing agents, corrosion inhibitors, and anti-foam agents may also be found as components of a dust.

Emulsifiable oils are usually solutions of active ingredient in water-immiscible solvents together with a surfactant. Suitable surfactants are anionic, cationic and nonionic and include, for example, alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the biodegradable and non-biodegradable sodium alkylbenzene sulfonates having 10 to 18 carbon atoms in the alkyl group, p-isooctylphenol condensed with 10 ethylene oxide units, sodium stearate, potassium oleate, sodium salt of propylnaphthalene sulfonic acid, (di-2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, octadecyl triethyl ammonium chloride, polyethylene glycol lauryl ether, polyethylene esters of fatty acids and rosin acids, sodium N-methyl-N-oleyltaurate, Turkey red oil, sodium dibutylnaphthalene sulfonate, sodium lignin sulfonate, polyethylene glycol stearate, sodium dodecylbenzene sulfonate, tertiary dodecyl polyethylene glycol thio-ether, long chain ethylene oxide-propylene oxide condensation products, sorbitan sesquioleate, polyethylene glycol esters of tall oil acids, sodium octyl phenoxyethoxyethyl sulfate, tris(polyoxyethylene) sorbitan monostearate and sodium dihexyl sulfosuccinate. The emulsifiable oil compositions generally contain from about 5 to 95 parts active ingredient, about 1 to 50 parts surfactant and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the fungicidal granules.

The mineral particles which are used in the granular fungicidal compositions of this invention usually have a size range of 10 to 100 mesh, but preferably such that a large majority of the particles have from 14 to 80 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as herein means U.S. Sieve Series.

The granular fungicidal compositions of this invention generally contain from about 5 parts to about 300 parts by weight of active ingredient per 100 parts by weight of clay and 0 to about 5 parts by weight of wetting agent per 100 parts by weight of clay. The preferred fungicidal granular compositions contain from about 10 parts to about 25 parts by weight of active ingredient per 100 parts by weight of clay.

The fungicidal compositions of this invention can also contain other additaments, for example, fertilizers, other fungicides, pesticides and the like, used as adjuvant or in combination with any of the above-described adjuvants.

Typical of auxiliary fungicides that can be employed in combination with the fungicidal compounds of the present invention are the following:

N-trichloro-methylthio-4-cyclohexene-1,2-dicarboximide
Tetramethylthiuram disulfide
Manganese e thylene-bis-dithiocarbamate
Ferric dimethyl dithiocarbamate
Zinc ethylene-bis-dithiocarbamate
Dinitro(1-methylheptyl) phenylcrotonate
Zinc dimethyl dithiocarbamate
5-ethoxy-3-trichloromethyl-1,2,4-thiadiazole
Tetra copper calcium oxychloride
Chloroacetaldehyde-2,4-dinitrophenylhydrazone
Tetrachloro-p-benzoquinone
2,3-dichloro-1,4-napthoquinone
2-dichloro-6-(o-chloroanilino)triazine
2,6-dichloro-4-nitroaniline
Ethylene thiuram monosulfide
2-heptadecyl glyoxalidine acetate
Ferric dimethyl dithiocarbamate plus 2-mercaptobenzothiazole
Manganese dimethyl dithiocarbamate plus 2-mercaptobenzothiazole
Copper dihydrazinium sulfate
5-amino-1-bis(dimethylamido)phosphoryl-3-phenyltriazol-1,2,4
Copper-S-quinolinolate
3,3'-ethylenebis(tetrahydro-4,6-dimethyl-2H-1,3,5-thiodazine-2-thione
Cycloheximide
Terramycin
Streptomycin When operating in accordance with the present invention, the 2,5-disubstituted-α-iodoacetanilides or a composition containing them can be applied to the fungal organisms to be controlled, or to their habitats in any convenient fashion, e.g. by means of hand dusters or sprayers. Applications to the above-ground portions of plants conveniently can be carried out with powder dusters, boom sprayers and spray dusters. In foliar applications, the employed compositions should not contain any appreciable amount of phytotoxic diluents. In large scale operations, dusts or low volume sprays may be applied from airplanes.

The embodiments of the invention in which an exclusive property or privilege is claimed are defined as follows:

1. Method of combatting fungal organisms which comprises contacting the fungal organisms with a fungicidally effective amount of a compound of the formula

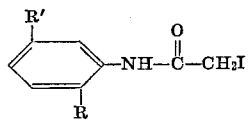

wherein R and R' are selected from the group consisting of chlorine, $NO_2$, hydroxy, alkyl of not more than 4 carbon atoms and alkoxy of not more than 4 carbon atoms.

2. Method of claim 1 wherein the fungal organisms are phytopathogenic.
3. Method of claim 1 wherein the compound is 2,5-dichloro-α-iodoacetanilide.
4. Method of claim 1 wherein R and $R^1$ are alkyl.
5. Method of claim 1 wherein the compound is 2,5-dimethyl-α-iodoacetanilide.
6. Method of claim 1 wherein R is chloro and $R^1$ is alkoxy.
7. Method of claim 1 wherein the compound is 2-methoxy-5-chloro-α-iodoacetanilide.
8. Method of claim 1 wherein the compound is 2-chloro-5-methyl-α-iodoacetanilide.
9. Method of claim 2 wherein the compound is 2,5-dichloro-α-iodoacetanilide.

References Cited
UNITED STATES PATENTS 3,403,994  10/1968  Olin.
3,404,976  10/1968  Olin.

ALBERT T. MEYERS, Primary Examiner

S. J. FRIEDMAN, Assistant Examiner

U.S. Cl. X.R.

260—562